Sept. 11, 1951  L. D. FORKEY ET AL  2,567,371
CIDER MILL
Filed Feb. 17, 1948  2 Sheets-Sheet 1

INVENTORS:
LYONAL D. FORKEY,
JOHN T. PETERSON AND
HENRY I. MORTON
by Dike, Calver + Porter Attys.

Sept. 11, 1951　　　L. D. FORKEY ET AL　　　2,567,371
CIDER MILL
Filed Feb. 17, 1948　　　　　　　　　　　2 Sheets-Sheet 2
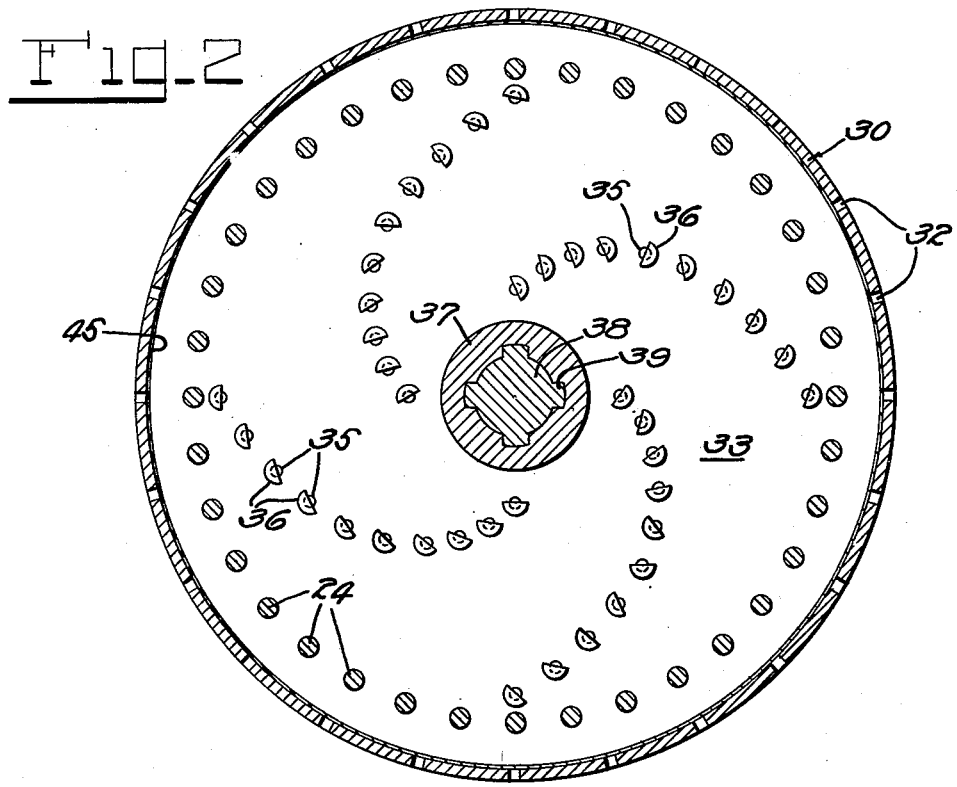
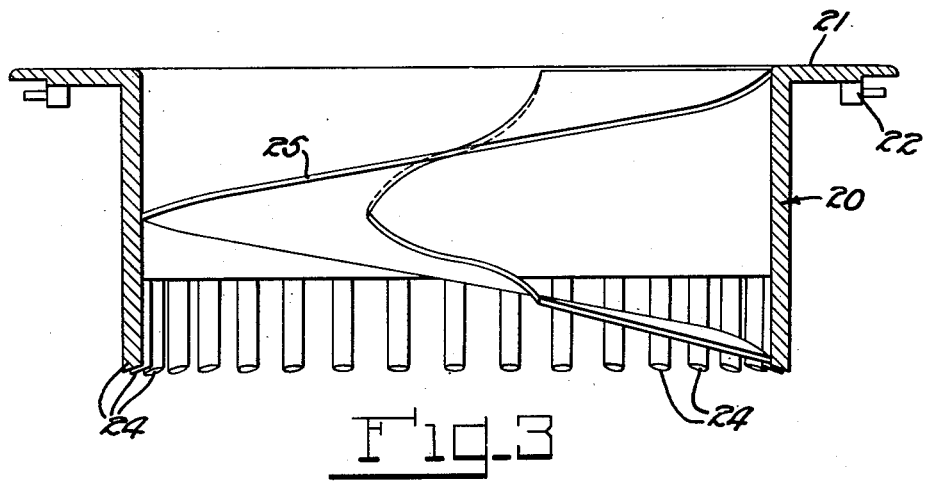
INVENTORS:
LYONAL D. FORKEY,
JOHN T. PETERSON AND
by　HENRY I. MORTON
Dike, Calver & Porter　Attys.

Patented Sept. 11, 1951

2,567,371

UNITED STATES PATENT OFFICE 2,567,371

CIDER MILL

Lyonal D. Forkey, Norwell, John T. Peterson, Melrose, and Henry I. Morton, Needham, Mass.; said Morton assignor to said Forkey and said Peterson Application February 17, 1948, Serial No. 8,905

2 Claims. (Cl. 146—76)

This invention relates to cider mills, and has for its object to provide a cider mill in which juice may be quickly extracted from apples or other fruit as ordered, before the customer's eyes, and served fresh to the customer. In this manner the customer may select, or at least see, the fruit from which his glass of juice is pressed, and in the case of apple juice, it can be served fresh to him in its natural light green color before it has a chance to turn brown from exposure to air. In addition, the mill is portable, and it can be quickly cleared of pulp or pumice after each pressing of fruit, and immediately made ready for the next batch of fruit. Because the fruit is ground up into fine particles or pumice, more of the juice can be extracted in this mill than by any of the other usual methods. There is no handling of this pumice until after the juice is extracted. The size and capacity of this mill may vary, of course, as desired, depending upon the volume of production wanted. With no other cider mill or juice extractor yet made, so far as we are aware, is it possible to extract the juice of apples or other fruit so quickly and so thoroughly, to discard the pumice, and then to make the mill ready for the next batch of fruit in so short a time. The entire operation with one batch of fruit takes only a few seconds.

For purposes of illustration, we have described our device as a cider mill, particularly for extracting juice from apples, but it will be understood that it can be used for extracting juice from other fruits, and from vegetables, or for extracting liquids from any material which is preferably finely ground in the process.

Briefly, our invention comprises a frame, preferably cylindrical, which rigidly supports on its top edge a cylindrical retainer, having a vertical wall and a spiral ramp or chute formed therein to receive the fruit and carry it down onto a rotating grinding surface. The retainer has apertures formed at its bottom edge and is placed inside a rotatable cylindrical basket, having a grinding surface provided on its floor, and apertures on its side walls, through which the juice is strained as the basket is rotated rapidly. The basket in turn is mounted on the vertically disposed shaft of an electric motor. In operation, apples or other fruit are placed in the retainer and are pushed down under the spiral ramp by the rotating grinding surface of the basket and are rapidly abraded by the grinding surface. The pumice is hurled against the side of the rotating basket, and the juice is strained out of it, passing out to the inside of the frame, where it is collected and drawn off from a spout provided therein. The pumice itself is preferably collected against a removable sheet of filter paper, or a fine mesh wire screen arranged inside the wall of the basket, where it can be readily removed, discarded and the basket cleaned after first removing the retainer.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings:

Fig. 2 is a horizontal section on line 2—2 of Fig. 1;

Fig. 3 is a vertical section through the retainer; and

Figure 1:
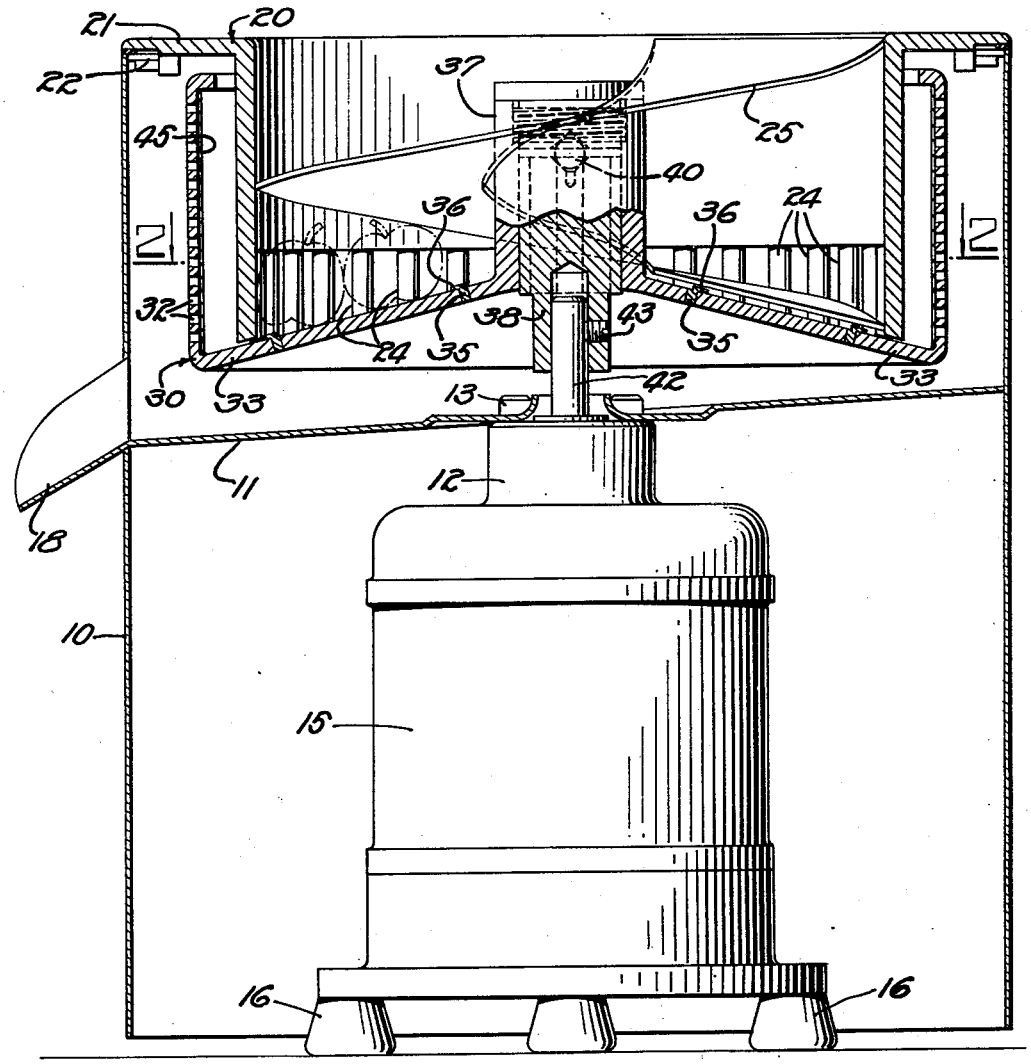
Fig. 1 is a front elevation of our device, partly in section.

In the drawings 10 represents a frame structure, preferably of stainless steel or other non-corrosive metal or material, and preferably cylindrical in shape. The frame 10 is divided into upper and lower compartments by floor 11 in turn fixedly mounted as by bolts 13 on the housing 12 of a vertically arranged electric motor 15 supported on legs 16. The upper compartment of the frame 10 forms a juice collecting compartment, floor 11 being preferably inclined to permit juice collected to run down to a spout 18 provided at the lower side of floor 11. Frame 10 is open at the top and on its top edges supports a retainer 20, preferably cylindrical in shape to fit the frame 10, and preferably cast from a non-corrosive metal or other suitable material. Retainer 20 has horizontal flanges 21 at its top edge fitting over the top edge of frame 10 and is rigidly locked thereon by suitable locking means such as a bayonet lock indicated at 22 (Figs. 1 and 3). The lower edge of retainer 20 is suitably apertured such as by means of spaced pins or rods 24 formed thereon, as shown in Figs. 1 and 3. A spiral ramp 25 is provided on the interior of retainer 20 and is suitably welded to the inside thereof.

Figure 4:
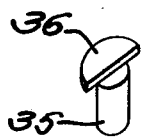
Fig. 4 is a perspective view of a grinding pin.

The side walls of retainer 20 fit and extend down into a rotatable cylindrical basket 30, being slightly spaced therefrom to provide clearance. Basket 30 again has vertical side walls with small apertures 32 formed therein and a floor 33 inclining downwardly from the center to its side walls. The top side of floor 33 forms a grinding or abrading surface provided by pins 35 mounted therein having a grinding head 36 on the top thereof, half of the head being cut away as shown in Figs. 1, 2, and 4. Pins 35 are preferably arranged in arcuate radii on floor 33 of basket 30 as shown in Fig. 2. Basket 30 in turn is provided with a central inverted well 37 which fits over a spline 38 having suitable keys 39 provided therein cooperating with complementary grooves formed in the inner surface of the well 37. A suitable ball bearing mounting 40 may also be provided. Spline 38 in turn is mounted on the vertical shaft 42 of motor 15, being held thereon by set screw 43 (Fig. 1). A piece of removable filter paper 45 (cloth, porous stone, fine mesh screen or other suitable filter material) is preferably mounted on the inside of the vertical walls of basket 30, as shown in Fig. 1, for the purpose of straining juice throughout apertures 32 of the basket 30 and retaining the pumice. It will be understood, of course, that the side wall 30 may be provided in a skeleton form, and the apertures 32 entirely dispensed with, and the filtering done entirely by the removable filter strip.

In operation, it will be understood that apples or other fruit are placed in the retainer 20, and the electric motor 15 being turned on, basket 30 is rapidly rotated. The rotating abrading surface on floor 33 of the basket 30 then carries the apples (indicated in Fig. 1) or other fruit against the under surface of ramp 25, where they are held down against the abrading surface and rapidly abraded and reduced to fine pumice or particles. The pumice or particles are thrown by centrifugal force horizontally out through the apertures between pins 24 at the lower edge of basket 20 and against the vertical walls of basket 30 and the filter paper 45 (or other filter material) which may be mounted thereon. Centrifugal force then drives the juice through the filter paper or screen 45 out through the apertures 32 of basket 30 and against the inside walls of the upper compartment of frame 10. The juice then rapidly flows down the inclined surface of floor 11 and out into a suitable glass or other container through spout 18. To clean the mill, retainer 20 is rotated slightly to release the bayonet lock 22 and is then lifted bodily out of the basket 30. The filter paper 45 can then be readily stripped off or lifted out and discarded. If fine mesh screen is used in place of filter paper, it can likewise be readily and quickly cleaned. Fresh filter paper (or the fine mesh screen) is then replaced inside basket 30 and retainer 20 is likewise reinserted and locked in the frame 10, and a new batch of apples or other fruit is then quickly processed in similar manner.

It will thus be seen that my device combines a grinder and centrifuge with other novel features, whereby juice may be readily and quickly extracted from apples and other fruit on the order of a customer or as desired.

We claim:

1. In a juice extractor having a frame, an electric motor mounted therein having a vertical shaft, a rotatable basket mounted on said shaft, a fruit retainer supported on said frame and having a wall extending downwardly into said basket, an inclined ramp in said retainer for holding the fruit while being ground, spaced slots provided on the lower edge of the wall of said retainer, a floor in said basket sloping downwardly from its center to its sides and carrying an abrading surface thereon for grinding fruit placed in said retainer, and said basket having porous side walls for filtering the juice from the ground pulp of the fruit thrown by centrifugal force against the porous side walls of said basket.

2. In a juice extractor having a frame, an electric motor mounted therein having a vertical shaft, a rotatable basket mounted on said shaft, a fruit retainer supported on said frame and having a wall extending downwardly into said basket, an inclined ramp in said retainer for holding the fruit while being ground, spaced slots provided on the lower edge of the wall of said retainer, a floor in said basket sloping downwardly from its center to its sides and carrying an abrading surface thereon for grinding fruit placed in said retainer, and said basket having porous side walls, and a removable filter for filtering the juice from the ground pulp of the fruit thrown by centrifugal force against the side walls of the basket.

LYONAL D. FORKEY.
JOHN T. PETERSON.
HENRY I. MORTON.

REFERENCES CITED

The following references are of record in the file of this patent:

UNITED STATES PATENTS

| Number | Name | Date |
|---|---|---|
| 234,946 | Blocker | Nov. 30, 1880 |
| 850,424 | Franklin et al. | Apr. 16, 1907 |
| 2,295,922 | Weston | Sept. 15, 1942 |
| 1,953,714 | Jenkins | Apr. 3, 1934 |
| 2,297,880 | Fredrickson | Oct. 6, 1942 |
| 2,325,779 | Kraber | Aug. 3, 1943 |
| 2,387,975 | Bennett | Oct. 30, 1945 |

FOREIGN PATENTS

| Number | Country | Date |
|---|---|---|
| 795,562 | France | Jan. 8, 1936 |